US006557492B1

United States Patent
Robohm

(10) Patent No.: US 6,557,492 B1
(45) Date of Patent: May 6, 2003

(54) SYSTEM FOR TRANSPORTING AND STORING LIVE FISH, COMPONENTS THEREOF AND METHODS BASED THEREON

(75) Inventor: Donald Robohm, Ocean Springs, MS (US)

(73) Assignee: Sea Chick, Inc., Escatawpa, MS (US)

( * ) Notice: Subject to any disclaimer, the term of this patent is extended or adjusted under 35 U.S.C. 154(b) by 0 days.

(21) Appl. No.: 10/198,741

(22) Filed: Jul. 19, 2002

(51) Int. Cl.[7] .................. A01K 63/02; A01K 63/04
(52) U.S. Cl. .................... 119/203; 119/261
(58) Field of Search ...................... 119/201, 203, 119/207, 215, 216, 261; 261/29; 220/562

(56) References Cited

U.S. PATENT DOCUMENTS

| 4,089,298 | A |   | 5/1978 | Wilson ................ 261/29 |
|---|---|---|---|---|
| 4,455,966 | A |   | 6/1984 | Knowles .............. 43/55 |
| 4,815,411 | A |   | 3/1989 | Burgess .............. 119/203 |
| 4,844,012 | A |   | 7/1989 | Jerrett ............... 119/203 |
| 4,880,740 | A |   | 11/1989 | Hoffman ............. 435/168 |
| 4,919,079 | A |   | 4/1990 | Morishita ........... 119/201 |
| 5,076,210 | A |   | 12/1991 | Horn ................. 119/203 |
| 5,117,777 | A |   | 6/1992 | Takasugi ............ 119/203 |
| 5,138,975 | A | * | 8/1992 | Walsh ............... 119/203 |
| 5,234,581 | A | * | 8/1993 | Rosenberg .......... 119/261 |
| 5,309,868 | A | * | 5/1994 | Tomiyama ........... 119/203 |
| 5,310,427 | A |   | 5/1994 | Manome ............. 119/201 |
| 5,463,983 | A |   | 11/1995 | Naguara ............. 119/203 |
| 5,556,536 | A |   | 9/1996 | Turk ................. 210/150 |
| 5,572,952 | A |   | 11/1996 | Manome ............. 119/203 |
| 5,722,345 | A |   | 3/1998 | Naguara ............. 119/203 |
| 5,762,024 | A |   | 6/1998 | Meilahn ............. 119/223 |
| 5,968,503 | A |   | 10/1999 | Crawford ........... 424/93.43 |
| 6,033,569 | A |   | 3/2000 | Sumino et al. ....... 210/605 |
| 6,050,550 | A | * | 4/2000 | Burgess ............. 261/29 |
| 6,059,270 | A | * | 5/2000 | Kurzer et al. ....... 261/29 |

OTHER PUBLICATIONS

Excerpts from Seaplast Canada Website (2000)—www.seaplast.com (products).
Excerpts from Peterson Fiberglass Lammota Inc. (2000)—www.petersonfiberglass.com.

* cited by examiner

Primary Examiner—Charles T. Jordan
Assistant Examiner—Elizabeth Shaw
(74) Attorney, Agent, or Firm—Chalin A. Smith; Smith Patent Consulting

(57) ABSTRACT

A live fish transport system is described herein. In particular, a modular live fish transport tote, an oxygen delivery system, an automated water treatment and delivery apparatus, and a chemically and biologically balanced aquaculture solution are described. Methods of making and using these components, either alone or in combination with each other, are also described.

17 Claims, 12 Drawing Sheets

TOP VIEW

SIDE VIEW

SYSTEM FOR TRANSPORTING AND STORING LIVE FISH, COMPONENTS THEREOF AND METHODS BASED THEREON

FIELD OF THE INVENTION

The present invention relates to an efficient live fish transport system. Also, the present invention relates to the components of this system including: a modular live fish transport tote, an oxygen delivery system, an automated water treatment and delivery apparatus and methods for use therefor, as well as a chemically and biologically balanced aquaculture solution and method for making same. The invention is applicable to fin fish as well as other seafood species such as crabs, oysters, lobsters, shrimp, and the like.

BACKGROUND OF THE INVENTION

Live fish in the United States have traditionally been transported over-the-road by "livehaul" trucks. These are typically flatbed trucks that have been significantly modified to carry fish. Modifications include the permanent installation of multiple insulated fixed tanks or boxes in the flatbed. These tanks typically have hinged lids on the top and one or more circular or rectangular release gates on the tank side(s) for discharging water and fish together. Mechanical aeration with small motors and propellers to splash the water have more recently given way to liquid oxygen tanks, manifolds carrying the gaseous oxygen to oxygen flow meters (or rotometers), and subsequently to bubblers located in the bottoms of the tanks.

The transportation of liquid oxygen is highly regulated. The United States Hazardous Material Regulations (HMR) have recently been amended to require permits for the transport of liquid oxygen held under 20 psi pressure. This is well below the 50 psi operating pressure used by most live fish transporters. Live fish transporters that employ a tank, cylinder or the like of cryogenic oxygen plumbed into a "process system" are not regulated by HMR and may be exempt from special permits (49 C.F.R. §173.320(b). However, any tank that is not an integral part of the process system or that is disconnected from the process system (e.g., a spare tank), is fully subject to HMR. Thus, to avoid cumbersome regulations and the hassle of the permit process, a preferred live fish transport system would be one that avoids the need for additional non-integral and/or spare tanks of liquid oxygen. The invention herein addresses this need by providing a more efficient oxygen delivery system.

In addition to facilitating compliance with HazMat regulations, the present invention may further facilitate compliance with FDA regulations. Newly instituted rules regarding prepared food fish (e.g., chilled or frozen seafood) require extensive testing and record keeping that is impractical for the smaller seafood producer. Though intended to increase the level of inspection and control of seafood as close to the source as possible, these rules have in fact encouraged the small producers to look more favorably upon selling fish live instead of frozen or chilled. As described in detail below, the present invention reduces costs and overhead associated with live fish transport, further encouraging producers to sell fish live rather than prepared.

The standard livehaul truck may be used for live bait hauling or fingerling stocking as well as for transporting live food fish. Long-haul livehaul trucks are usually 18-wheelers, and short-haul trucks are usually straight bodied three-axled 10-wheelers. Due to the variety and types of loads, pickup and discharge locations, the configuration of these livehaul trucks is far from standardized. Rather, the livehaul truck is a highly specialized, dedicated piece of equipment for which there is little or no other alternative use. Due to the limited supply and erratic schedules of these specialized trucks, live fish producers and their customers are rarely able to coordinate supply and demand.

Loading of the live fish onto the dedicated livehaul truck can be quite cumbersome and costly. Typically, the fish are loaded dry (i.e., in nets without water), directly from the tanks and/or ponds of the fish farm into the integral fish tanks of the livehaul truck. Fish producers are faced with dirty trucks arriving with biologically "hot" fish diseases, breaking the bio-security of their facilities with unknown consequences for remaining fish on the farm. and diseases almost certainly transferred to the fish being transported and sold. Furthermore, the livehaul truck frequently must be retrofitted with stiffening and strength materials to allow it to traverse the poorly maintained farm roads and climb the pond levee. The stiffening and strengthening add to the tare weight of the truck and, therefore, the shipping costs. The on-site loading results in a lot of wasted truck and driver time, which also adds to the total cost of shipping.

There are clearly significant disadvantages and drawbacks associated with the current livehaul system. The present invention attempts to address these problems, to remove the limitations and reduce the overall costs associated with live transport of commercial quantities of food fish.

For example, there is clearly a need in the art to "uncouple" the fish farmer from the traditional livehaul trucker's specialized equipment and instead allow the farmer to use any common carrier's equipment such as a flatbed truck or enclosed van. The present invention addresses this need by providing modular, standardized, forkliftable fish transport and storage totes designed to be readily interchangeable, regardless of the type of truck or fish to be transported.

There is further a need to reduce time between harvest and delivery. Traditional livehaul trucks require that the fish be "prepared" in either dedicated purging tanks for days prior to shipment or on the truck once the fish are loaded. Preparation typically involves chilling down the fish to slow their metabolism and the adjusting the water chemistry and dissolved oxygen level tank by tank on the truck. The present invention addresses this problem by allowing the farmer to ready the fish upon receipt of order. The truck then arrives to a shipment ready to be immediately loaded and transported.

On a related note, the current methods of thermally preparing fish are quite problematic. Typically, fish are chilled by adding bagged crushed or block ice to the fish tank. This method is very dangerous and usually harmful to fish. Sudden large water temperature changes (up or down) are stressful and potentially lethal to fish. Control and accuracy with ice is virtually impossible. The present invention addresses this problem by providing an automated water treatment and delivery apparatus, including a chiller/heat pump, to carefully control the amount of temperature change and the rate of change per unit of time, digitally monitoring and adjusting against given settings, without human intervention.

There is further a need to limit the handling, netting, moving by pump, draining via chutes, and otherwise touching of the live fish between production tank and end user, to eliminate the numerous intermediate transport handling steps that are currently required. The system of the present invention allows the fish to be harvested directly into modular fish transport totes, purging and preparing (e.g., chilling) the fish for shipment in the same tote, and transporting, distributing and holding the fish at the destination until sold without removing the fish from the harvest tote.

The above process not only reduces the introduction and transfer of biohazards but also results in considerable labor and material energy cost savings. Traditional harvest-purge-chilling systems use large non-insulated tanks that are open to the air. The larger volume of water and the lack of insulation together correlate to much more electrical power consumption. Likewise, the requisite rate of heat gain or loss correlates to much larger, more expensive compressor units and more compressor motors. For example, whereas fish in a traditional load-out" production tank, typically an uninsulated, out-of-doors, concrete tank, can take 36 to 48 hours to "prepare", fish prepared using the system of the present invention can be prepared in under 8 hours with certainty of timing and temperature, with less electrical energy and management supervision.

There is further a need to protect against the introduction and transfer of fish born diseases, both at the origin site and destination site. Commingling fish species from widely separate, often unknown sources, threatens the entire live food fish industry. Likewise, certain states, such as California are currently contemplating "non-dumping" laws which would forbid the dumping of out-of-state live fish transport waters on the ground or into non-municipal water-treatment drainage to prevent the introduction of out-of-state fish diseases.

The modular nature of the fish transport tanks of the present invention address both of these issues. First, unlike the current generation of fish transport tanks, the fish transport totes of the present invention do not utilize a side port that dispenses both fish and water together. Rather, the totes have a hinged yet removable lid and sides that coordinate with the standard forklift, allowing the totes to be rotated and dumped by forklift, thereby avoiding the substantial ground spillage associated with the conventional side port designed for fish and water dispensing. Second, the fish transport totes of the present invention have removable components and an easily accessible interior. This allows all surfaces of the tote and its components to be decontaminated between loads, thereby lowering the risk of pathogen transfer among the fish pond, truck and destination site.

There is further a need to efficiently maintain a balanced environment for the fish during transport. Conventional fish transport tanks are generally sealed during transport. While this indeed prevents water spillage, it also prevents free air exchange which, in turn, results in a build up of toxic chemicals, such as carbon dioxide and ammonia, in the fish environment. In fact, dirty, murky water is the norm for most livehaul shipments. On-board water recycling systems are known in the art of crustacean transport (see, for example, U.S. Pat. No. 4,089,298). However, in terms of capital cost and loss of payload considerations with the 80,000 pound max federal gross weight truck-trailer limitation, the incorporation of such devices into the commercial transport of food fish is so expensive and inefficient as to be impractical.

The present invention addresses this need by providing an automated water treatment and delivery apparatus for use at the tote origin and a chemically and biologically balanced aquaculture solution for use in transit. Also, as described in detail herein, the present invention provides a system designed to take dirty water from many individual tanks, filter it, chill it, remove ammonia and carbon dioxide in a central unit, and return the processed water back to many tanks. Because of potentially different bio-loadings of individual totes, the independent oxygen delivery system is separate from the water circulation, allowing one to turn off the water circulation pump and hold the fish in the totes without water exchanges. Thus, fish may be transported and stored over extended periods of time in the balanced aquaculture solution of the present invention without need for water recycling or water exchange.

In addition to solving many of the problems associated with traditional live fish transport, the system of the present invention allows advances not possible or practicable under current systems. For example, using the system of the present invention, one can "accessorize" the farm fish. Instead of backhauling empty totes, small quantities of other species can be "sourced" at the farm site, placed in totes, transhipped, and loaded out with the other totes filled with the farm fish. Thus, the totes may be individualized for a particular market, mixing and matching small quantities in mixed loads intended for a variety of different locations. This "accessorizing" of species can be handled with a high degree of uniqueness impossible with traditional livehaul trucks.

Likewise, the present industry norm has live fish in a "holding" pattern, not gaining weight but taking up production tank space that could be used to grow additional pounds of new fish. The system of the present invention allows for the harvest of "market-sized" fish when ready, and keeping them in a finished goods inventory occupying substantially less space at a fraction of the cost, and far more concentrated in terms of space taken up. Fish transported under traditional conditions (e.g., kept off feed at higher water temperatures and with water chemistry that causes them to stress while trying to osmoregulate) lose 4–5% of their body weight per day. Conversely, fish stored in stasis in the inventive totes, when coordinated with the automated water treatment and delivery apparatus of the present invention, lose less than ¼% of their body weight per day. Thus, customers can be assured of selling virtually all the live fish weight they purchase.

Finally, recipients of traditional livehaul loads generally must have their own display or holding tanks to receive the off-loaded live fish. The present invention allows the delivered fish to stay in the transport totes, and thus provides a variable holding capacity adjustable with each delivery of fish. The inventive totes can be pallet-jacked to a space within a retail supermarket seafood department and hooked up to a small high-pressure bottle of oxygen. The live fish can then be netted and sold directly out of the tote to the end user. The modular nature of the totes allows supermarkets to take delivery of much higher volumes without the fixed capital cost of meeting a seasonal demand change.

In sum, the present invention not only improves aspects of the conventional live fish transport system but may indeed revolutionize the entire live seafood industry. The present invention allows the conventional "harvest to order" mode of fish farming to be replaced by a continuously maintained inventory of live fish finished goods available for shipment at any time, on a moment's notice.

SUMMARY OF THE INVENTION

The present invention generally relates to a system for improving the efficiency of live fish transport. More particularly, the present invention relates to the components of the system including a live fish transport tote, an oxygen delivery system, an automated water treatment and delivery apparatus, and a chemically and biologically balanced aquaculture solution.

Accordingly, it is an object of the present invention to provide an oxygen delivery system having (1) an oxygen flow meter; (2) a supply coupling for fluidically connecting the flow meter to an oxygen supply line; (3) a delivery coupling for fluidically connecting the flow meter to an oxygen delivery line; (4) an oxygen diffusing system comprised of radially projecting or extending oxygen diffusers directing oxygen flow to the periphery of a fish tank; and (5) an oxygen delivery line sealingly connecting the rotometer to the oxygen diffusing system.

Another object of the present invention is to provide a modular "forkliftable" insulated live fish transport tote formed from a lightweight, durable, food-grade material and having interior and exterior surfaces, an integral base and side walls, and a gasketed removable lid with a vent hole disposed in the center thereof.

The live fish transport totes of the present invention may be used in combination with other aspects of the present invention, such as the oxygen supply system, the balanced aquaculture solution and the water treatment and delivery apparatus described herein. However, the fish totes of the present invention are not limited to this utility or combination.

It is a further object of the present invention to provide a method for using the inventive totes to transport and store live fish over extended periods of time with minimal morbidity and mortality.

Still another object of the present invention is to provide a chemically and biologically balanced aquaculture solution for transporting and storing live fish over extended periods of time with minimal morbidity and mortality. The solution is maintained at a temperature sufficient to induce thermal stasis in fish. In addition, the solution is substantially free from carbon dioxide and ammonia, and further contains an osmoregulatory salt gradient, an oxygen saturation level sufficient to maintain a plurality of fish, a calcium water hardness level sufficient to induce toughening of fish scales, a dynamic pH buffering system, and a bioactive bacterial culture. Unlike traditional live fish haulers, the present invention does not require the use of non-FDA anesthetic chemicals to quiet and still the fish. All the components of the inventive solution, including the active bacteria, are food-grade, e.g., human ingestible chemicals found in ordinary foods.

The present invention further provides a method for preparing the chemically and biologically balanced aquaculture solution for use in transporting live fish over extended period of time, comprising the steps of: (a) removing particulate matter from source water; (b) filtering the source water through an ammonia remover; (c) adjusting the temperature of the filtered water to a temperature suitable to induce thermal stasis in fish; (d) removing the carbon dioxide from said cooled, filtered water; and (e) adding chemical and biological balancing components to the water.

Another object of the present invention is to provide an automated water treatment and delivery apparatus for removing water from a plurality of live fish transport tanks and treating and returning the water to the same tanks, the apparatus comprising: (1) an ammonia remover; (2) a temperature controller; (3) a water reservoir; (4) a carbon dioxide remover; (5) a water dispenser; (6) a suction system; and (7) a circulation pump for circulating water through components (1)–(6), wherein the components are fluidically interconnected.

Still another object of the present invention is to provide a method for transporting and storing live fish over extended periods of time comprising the steps of (a) harvesting a quantity of fish and source water into a plurality of live fish transport totes; (b) coordinating the totes with the automated water treatment and delivery apparatus, such as that described above, wherein the apparatus suction system removes source water from the totes and the apparatus circulation pump circulates the source water through the apparatus filtration and treatment components; (c) treating the filtered source water and continuously circulating the water therethrough until a chemically and biologically balanced aquaculture solution is established; (d) returning the aquaculture solution via the apparatus water dispenser to the plurality of live fish transport totes; and (e) loading said totes onto a delivery vehicle, wherein said fish may be transported and stored within said totes for an extended period of time with minimal stock loss.

These and other objects, aspects, features, and advantages of the invention will become evident upon reference to the following description.

BRIEF DESCRIPTION OF THE DRAWINGS

FIG. 1A depicts a side view of a short-haul livehaul truck, particularly showing the hinged lids and side ports of the fish tanks. FIGS. 1B and 1C depicts a side view of a long-haul livehaul truck, particularly showing the side ports for simultaneously dispensing of both water and fish.

FIG. 6A depicts a top-down view of the corner of the tote, particularly depicting the recessed cam lock hook disposed on the corner of the tote side wall. FIG. 6B depicts a side view in cross section of the corner of the tote side wall, particularly depicting the recessed cam lock hook and gasket lip. FIG. 6B depicts a side view in cross section of the corner of the tote side wall engaged with the corner of the tote lid, particularly depicting the interaction between cam lock hook and cam lock fitting.

DETAILED DESCRIPTION OF THE PREFERRED EMBODIMENTS

As used herein, the term "fish" encompasses not only animals taxonomically classified as such (e.g., fin fish) but also "fishery products" and includes, for example, a wide variety of saltwater and freshwater fish species as well as crustaceans, shellfish, and other species exhibiting similar life-support requirements.

As used herein, the term "tote" refers to an insulated container modified and adapted for harvesting, storing and transporting live fish. The totes of the present invention have generally rectangular or square cross-section, although other shapes are within the scope of the invention.

Figure 1A:
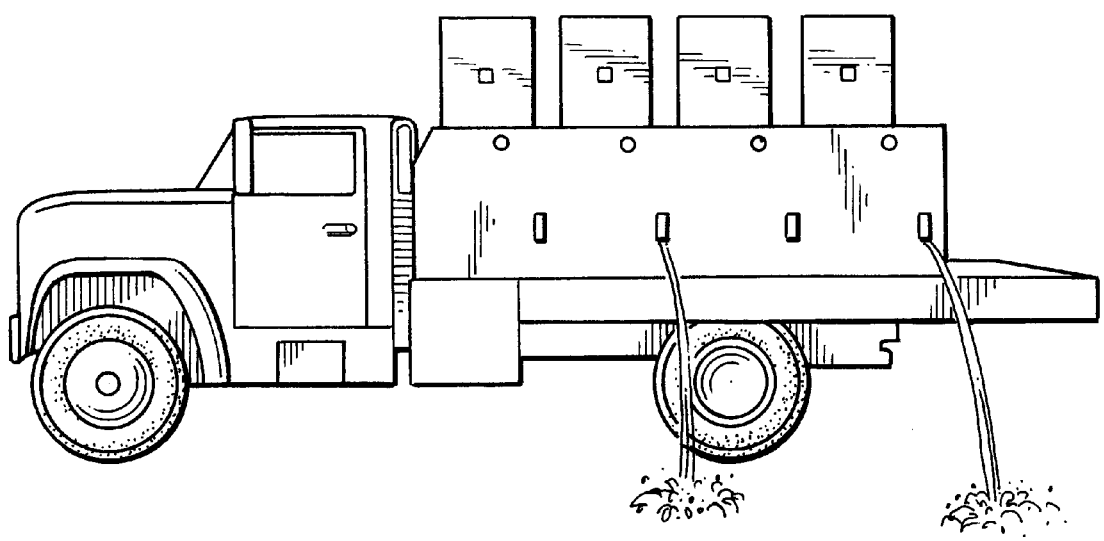
FIGS. 1A–1C depict typical dedicated livehaul trucks (Prior Art).
Figure 1B:
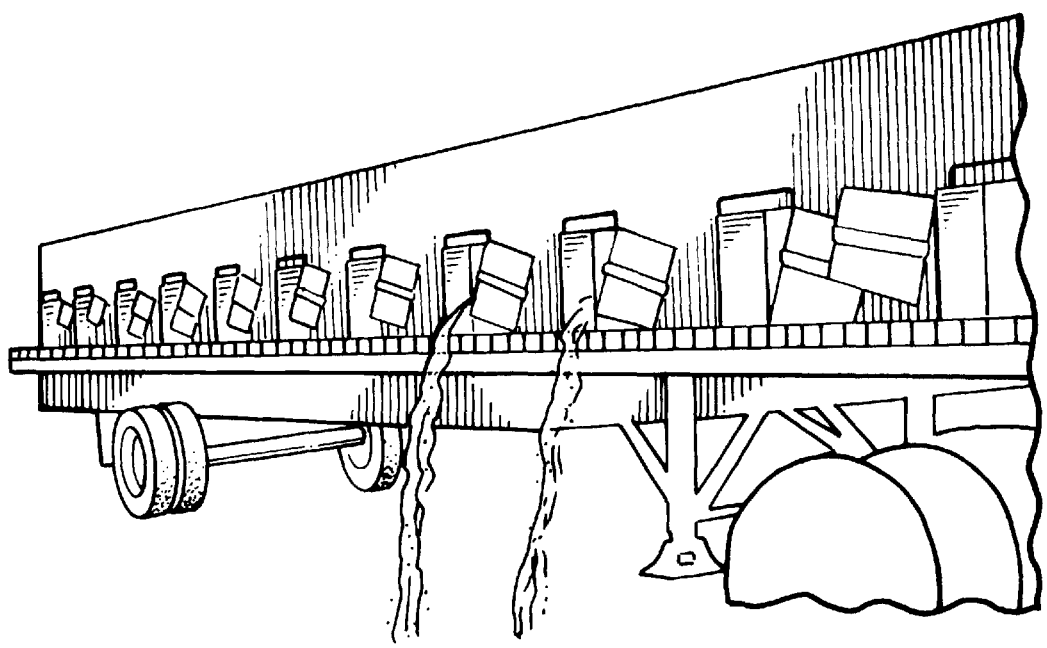
Figure 1C:
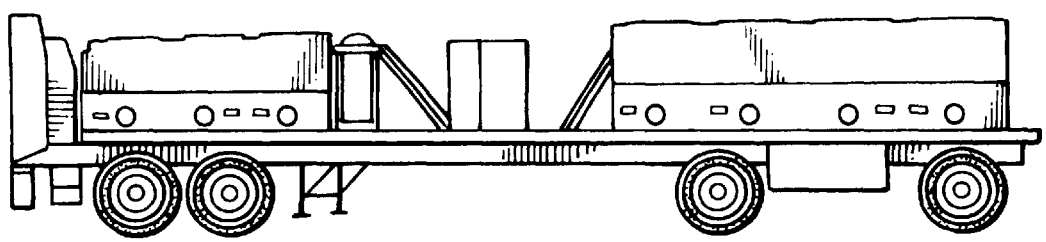

Traditional livehaul trucks and methods of using same are depicted in FIGS. 1A–1C. Insulated tanks for use with (and fixation to) these traditional livehaul trucks are known in the art and available from numerous commercial sources such as Seaplast PLC (Dalvik, Iceland), Seaplast Canada Ltd. (New Brunswick, Canada) and Peterson Fiberglass Laminates, Inc (Shell Lake, Wis.). These insulated tanks may be manufactured from a number of different materials including fiberglass, plastic, wood, and metal. The traditional long distance livehaul tank has a permanently adhered top having a hinged lid therein to facilitate access to the tank interior and one or more large circular or rectangular release gates on the side thereof for discharge of water and fish together.

The present invention provides a modular insulated container or "tote" and method for use of same to transport and store live fish over extended periods of time with minimal morbidity and mortality. The tanks or "totes" of the present invention represent a vast improvement over traditional livehaul fish tanks. The live fish transport tote of the present invention is preferably lightweight and durable and have interior and exterior surfaces that are completely accessible so as to facilitate the decontamination and biological cleaning.

The live fish transport totes of the present invention may be used in combination with other aspects of the present invention, such as the oxygen supply system, the balanced aquaculture solution and the water treatment and delivery apparatus described herein. For example, the live fish transport tote may be used in combination with the improved oxygen delivery system and chemically and biologically balanced aqueous system described herein. The insulated totes, in combination with the chemically and biologically balanced aquaculture solution and the oxygen supply system of the present invention, provides a self-supporting aqua-environment for the transportation and storage of live fish over extended periods of time. In fact, fish may survive in the tote environment for up to seven days without water exchange. Although this combination represents a preferred embodiment, the fish totes of the present invention are not limited to this utility or combination.

The modular fish tote, particularly when used in combination with the balanced aquaculture solution of the present invention, may be densely packed with fish with minimal stock loss. Fish density (pounds of fish per gallon of water or kilos of fish per cubic meter) for the inventive totes preferably ranges from about 0.75 to 3.5 lbs/gal, more preferably about 1.5 to 2.5 lbs/gal. The inclusion of activated bacteria in the aquaculture solution allows for a 50% higher density than that without bacteria. In a more preferred embodiment, the totes of the present invention allow for the transport of about 15,000 pounds of live fish on an 80,000 pound gross weight 18-wheeler delivered with less then 10 dead fish after two days truck transit, traveling almost 3,000 miles.

The totes of the present invention are preferably made from lightweight, durable, medium-density polyethylene resins. However, other materials such as fiberglass and other plastics are contemplated by the invention. The totes are preferably fabricated from food-grade materials so as to avoid issues of contamination and allow them to be easy to clean. A material is "food-grade" if it is inert or ingestible by human without any ill-effect. In a preferred embodiment, the tote is fabricated from a material that is sufficiently translucent so as to allow for the monitoring of the status of the insulation layer, such that gaps in the insulation may be readily identified and repaired.

Another important aspect of the totes of the present invention is thermal performance. Unlike other live transport containers, the totes of the present invention do not need to include multiple drain plugs or a large release gate or hoisting/lifting points on two opposite sides, all of which significantly interfere with the thermal properties of the container. In addition, the totes are preferably fabricated from a "double walled" material, i.e., a layer of insulating material is disposed between the outer and inner tote walls. Exemplary insulating materials include polymeric foams, such as self-expanding polyurethane foams and foamed polystyrene. This double-wall construction facilitates the maintenance of species-appropriate water temperatures even in extreme weather conditions. Preferred totes will have a thermal resistance insulation factor of R18 or higher. The R-value is a measure of resistance to heat flow, therefore a higher R-value correlates to better insulation performance.

In another embodiment, the thermal performance is achieved by the use an insulating tote cover. The cover preferably comprises a thin-filmed radiant barrier on a linear low-density polypropylene (LLPP) substrate that reflects 97% of all radiant heat energy. Using such tote covers, one can maintain temperatures to ±1° F. for 24-hours in a 95° F. ambient air temperature and 30 mph wind blowing constantly across the covered tote. The thin film radiant barrier may be a separate component, such as a tote cover, or, alternatively, can be fabricated into the tote wall.

The particular dimensions of the live fish transport tote are not critical to the invention. Preferred totes are those having a volumetric capacity of greater than 500 liters (about 125 gallons), more preferably greater than 1000 liters (about 250 gallons) and a weight capacity (when filled with water) of 1000 kilograms (about 2200 pounds) or more. Preferred totes are capable of transporting at least 250 pounds, more preferably greater than 450 pounds of live fish.

Figure 2:
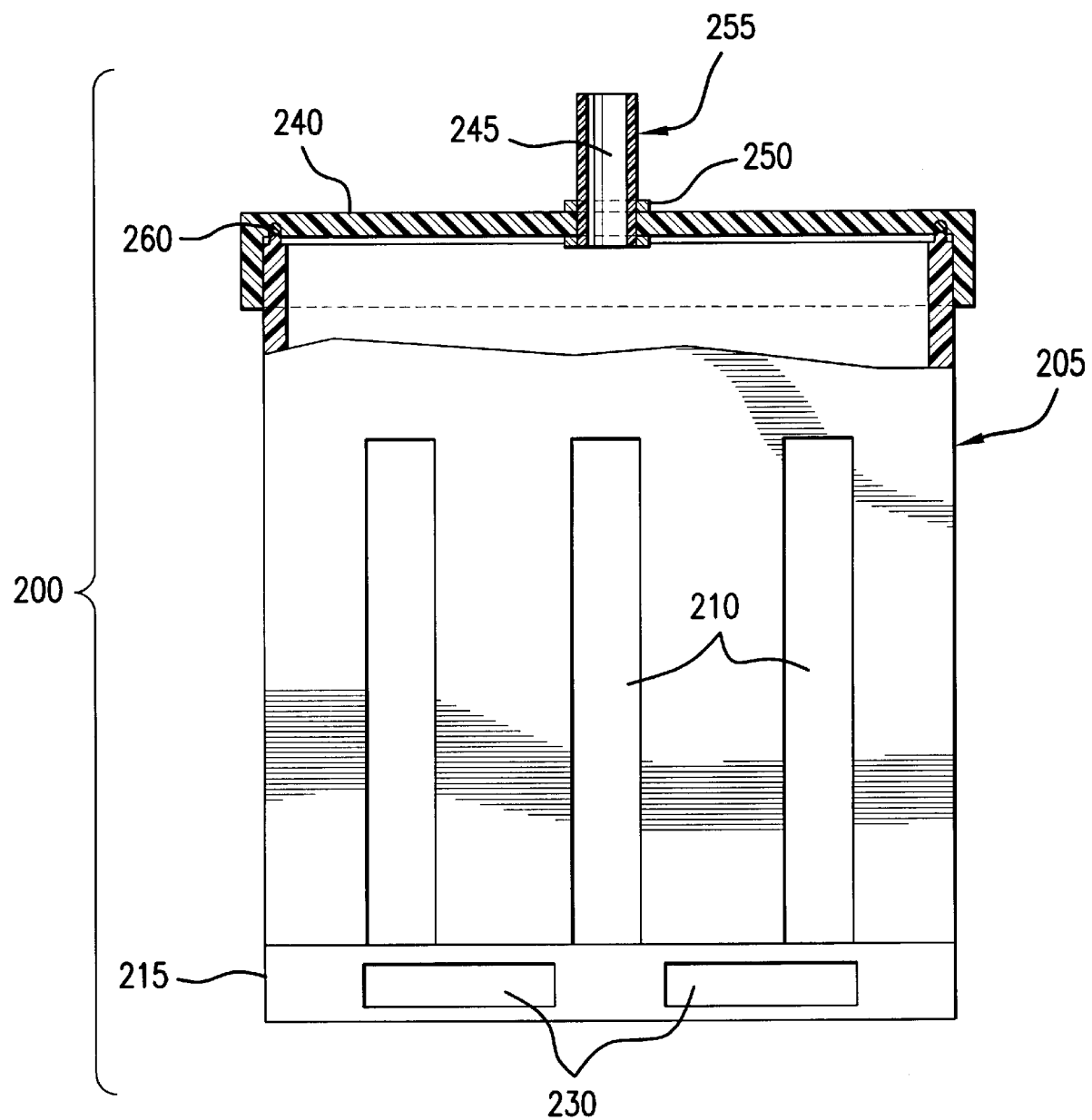
FIG. 2 depicts a side view of a preferred embodiment of the live transport fish tote, particularly depicting the removable, gasketed lid with periscope disposed therein and the forkliftable footed base and side walls.

A preferred embodiment of the live fish transport tote is shown in FIG. 2. Referring to FIG. 2, the cube-like insulated fish tote (100) has a rectangular cross section, with a width of about 35–45 inches, a length of about 40–50 inches, and a height from base to lid of about 40–50 inches. This size is preferred for several reasons. First, being 40–50 inches high, the average person can stand next to the tote and use a small fishing net to net out the live fish therein. Second, the size allows for maximized packing and transport efficiency. The total dry weight is about 150–200 pounds and weight capacity (when filled with water and fish) ranges from 2000–2500 pounds. Thus, 26 totes and 2 PG4500 liquid oxygen tanks fit on a standard 48 foot long transport trailer and their fill weight (water+fish) just reaches the 80,000 pound gross weight allowed by federal highway limits.

As mentioned above, unlike conventional live fish transport tanks, the totes of the present invention do not require the use of a specialized, dedicated transport truck. Their simplicity and self-sufficiency allows them to be carried by any standard truck, from a flatbed 18-wheeler to a covered three-axle truck to a panel van. For example, the totes of the present invention are designed to be "forkliftable" (i.e., having sides and/or base constructed to engage the fork tines of standard forklifts). As shown in FIG. 2, the tote include forkliftable side walls (205), each of which include a plurality of grooves (210) that coordinate with a standard forklift. This design allows the tote to be lifted from any angle and from any position.

Figure 3A:
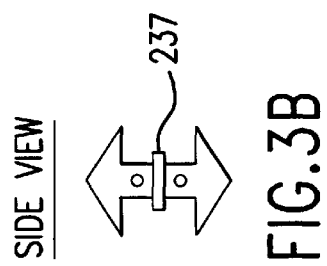
FIGS. 3A and 3B depict top down (3A) and lateral views (3B) of the twist lock pins that coordinate with the twist lock pin receiving holes to lock the tote in position during transit.
Figure 3B:
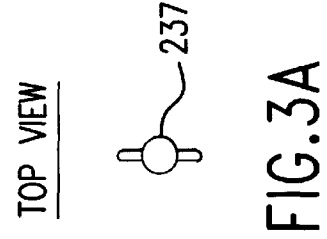
Figure 3:
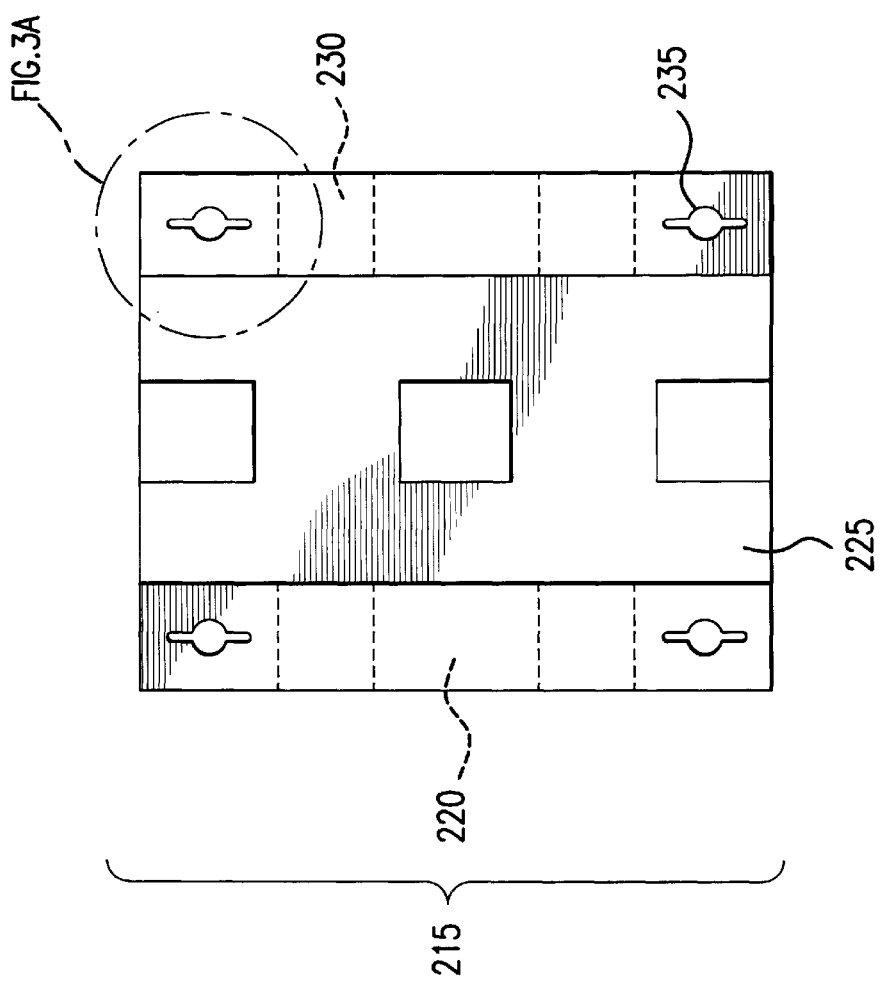
FIG. 3 depicts a bottom-up view of the footed base of the preferred embodiment of the live transport fish tote, particularly depicting the open and closed slots, formed between center and corner supports, that coordinate with the tines of a forklift and the twist lock pin receiving hole disposed in the each of the four corners.

In a preferred embodiment, such as that shown in FIG. 2, the tote (200) includes a "forkliftable" footed base (215) having two sides that coordinate with the fork tines in an open fashion (i.e., allowing the tote to be easily lifted and transported) and two sides that coordinate with the fork in a closed fashion (i.e., allowing the tote to not only be lifted and transported but also upended). This configuration is further depicted in FIG. 3. Referring to FIG. 3, the footed base (215) has corner and center supports or footings (220) that form a plurality of recesses (225, 230) that coordinate with the tines of a fork lift (not shown). Open recesses (225) allow for the tote to be lifted and transported by a standard forklift. Closed recesses (230) allow for the tote to be not only lifted and transported but upended to facilitate dumping on both fish and water from a full tote. While the size and shape of the totes of the present invention is not critical, the preferred tote has a base analogous to a commercially available "pallet".

The footed base serves a secondary function in that it allows air to circulate beneath. This design essentially adds an additional layer of insulation, preventing direct contact heat transfer, further insulating the fish environment within the tote from the interior truck environment and/or environment exterior to the truck.

The totes of the present invention may further be designed to be modular and interlocking with each other or with the transport truck. For example, the totes may have coordinating features that releasably attach and detach, allowing the totes to be either locked to each other or onto the transport truck. In one preferred embodiment shown in FIG. 3, the footed base (215) has a plurality of twist lock pin receiving holes (235) disposed in the corner supports (220). These twist lock pin receiving holes coordinate with self-centering twist lock pins (237) shown in FIGS. 3A and 3B. Additional examples of such interlocking mechanisms are known in the art. The inclusion of such locking mechanisms allows the tote to be locked in place on a truck. Thus, the totes can be loaded and secured during transit yet easily detached at the destination.

As shown in FIG. 2, the tote (200) of the present invention also includes a removable lid (240) having a vent hole (245) disposed in the center thereof. It has long been believed that the lid must be completely sealed to prevent the water within the transport tank from "sloshing" over the sides during transport. The present inventor recognized that the "slosh" phenomena only occurs at the periphery of the tank. Thus, one can indeed place a hole in the center without having to worry about overflow.

Figure 8:
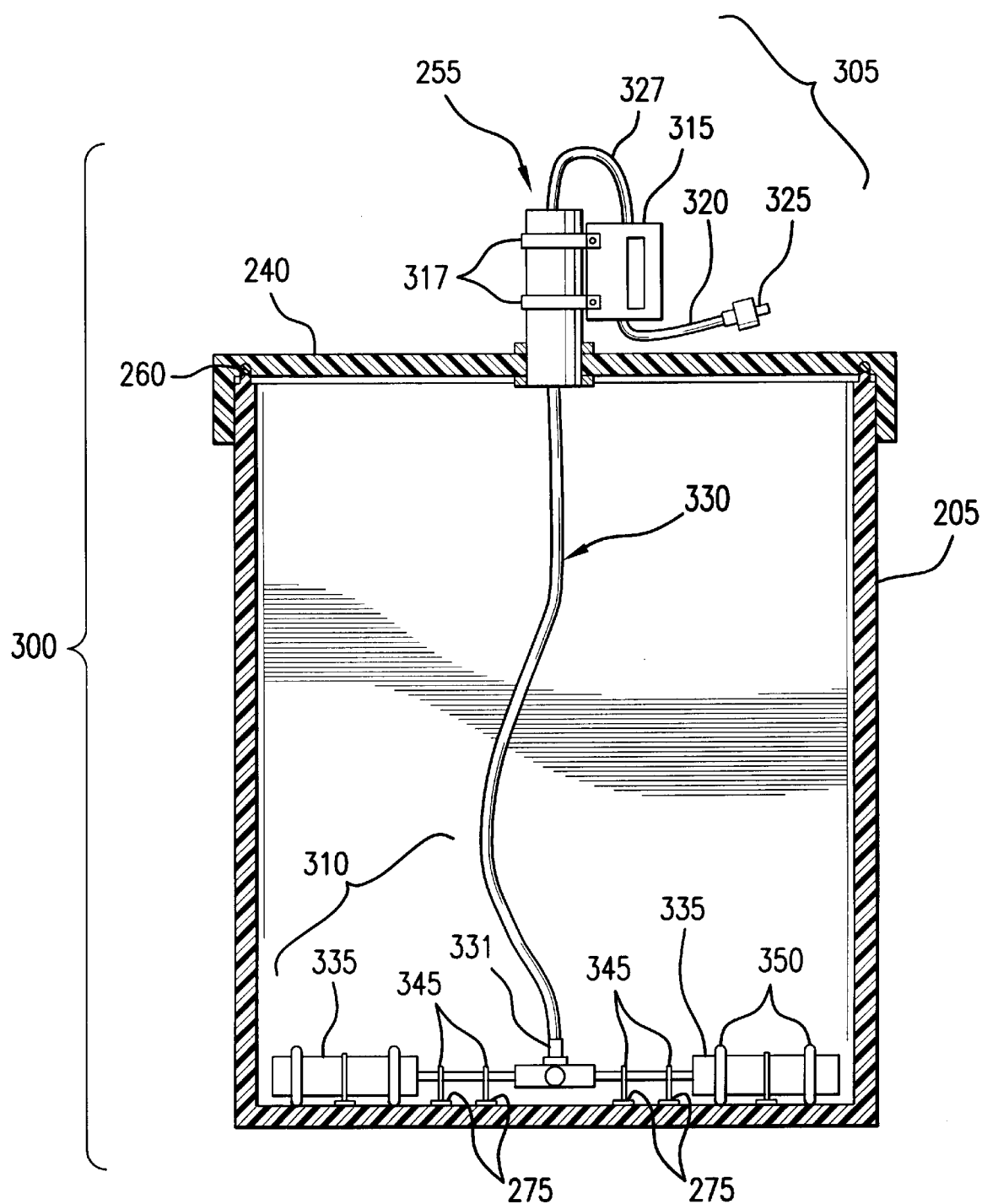
FIG. 8 depicts a side view in cross section of a preferred embodiment of the oxygen delivery system in combination a preferred embodiment of the fish transport tote.

This center vent hole (245) is an important aspect of the invention as it allows the free exchanges of gases (oxygen in, carbon dioxide and nitrogen/ammonia out) during transport. This free exchange not only prevents the build up of toxic levels of unwanted gases but also reduces the amount of infused oxygen required during transport. The vent hole also serves a secondary function: providing a pathway for an oxygen delivery line, a line that preferably extends from a rotometer disposed at the top of the tote to at least one oxygen diffuser disposed at the bottom. This configuration is depicted in FIG. 8 discussed in detail below.

Figure 4:
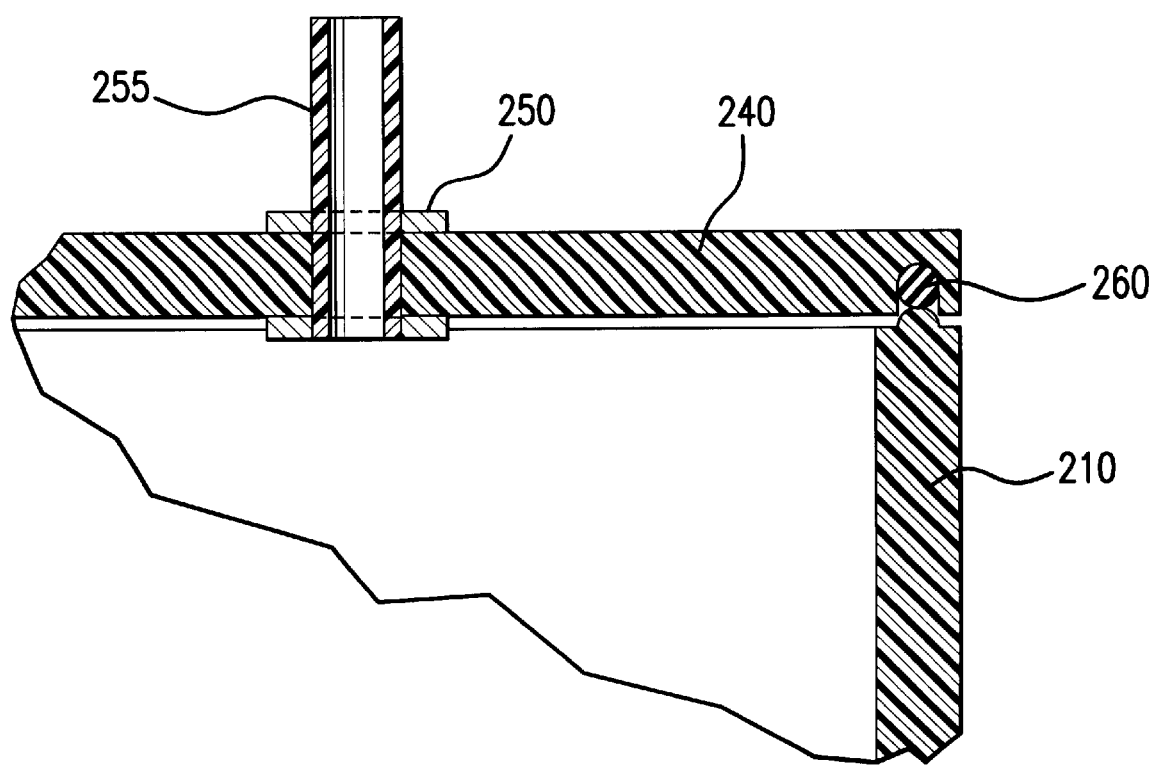
FIG. 4 depicts an exploded view in cross section of a top corner of the preferred embodiment of the live transport fish tote, particularly depicting the bulkhead fitting and periscope disposed in the vent hole in the top of the lid and the sealing gasket disposed between lid and side walls.

In a preferred embodiment, a bulkhead fitting (250) is disposed in the center vent hole (245). The bulkhead fitting (250) coordinates with a short length of pipe, dubbed the "periscope" pipe (255). This configuration is best shown in FIG. 4. The periscope maintains the water level inside the totes while allowing free air-exchange between the interior and exterior environments. The periscope may be fabricated from any suitable material though hard polymers such as polyvinyl chloride (PVC) are most preferred.

As discussed above, the periscope pipe (255) fitted in the center vent hole (245) of the tote lid (240) serves a secondary function: coordinating with the oxygen supply/delivery line of an oxygen delivery system. The periscope may further include a mounting mechanism (not shown), such as a bracket or coupler, for coordinating with the oxygen flow meter (rotometer) of an oxygen delivery system. The mounting mechanism allows the rotometer to be fixed to the tote periscope, such that the rotometer is vertical when the tote lid is horizontal. In an alternate embodiment, the mounting mechanism comprises a swivel mount, wherein when the tote lid is removed (e.g., resting along side the tote), the rotometer can be swiveled into its required vertical position, and used in that position. A preferred embodiment of this configuration is described in detail below and best shown in FIG. 8.

Figure 6A:
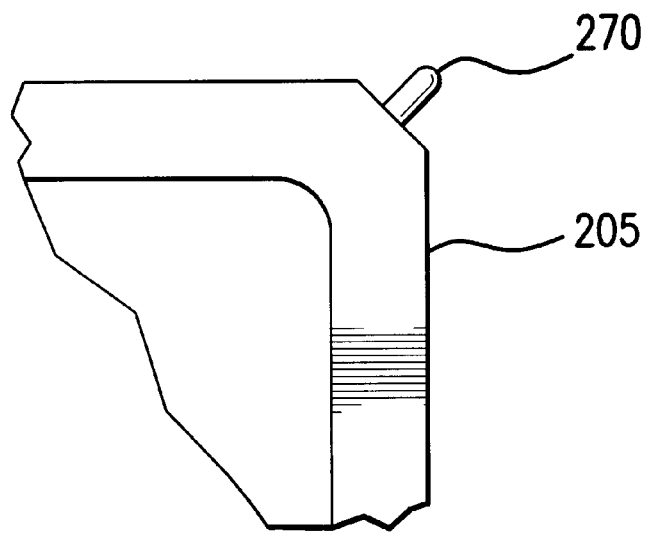
FIGS. 6A–C depict exploded views of the coordinating cam lock hook and fitting disposed between the lid and corner of the preferred embodiment of the live transport fish tote.
Figures 6B, 6C:
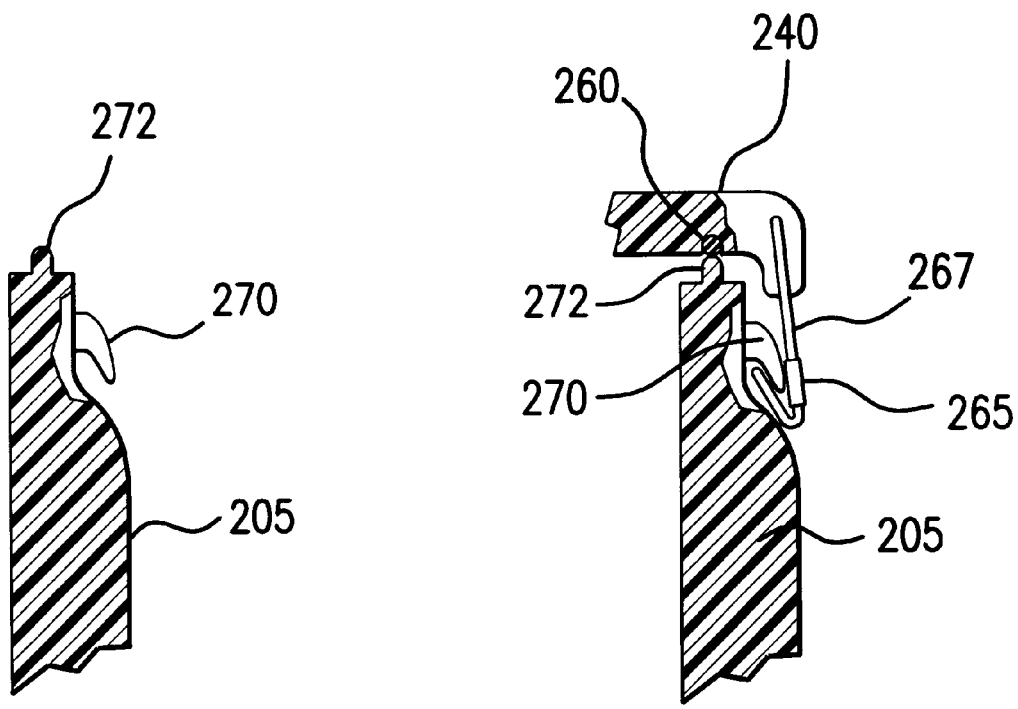

In the preferred embodiment, the live fish transport tote (200) further includes a gasket (260) disposed between the tote side walls (205) and tote lid (240), allowing for a fluid tight seal. The tote side walls (205) may further include a gasket lip (272). This configuration is best depicted in FIGS. 4 and 6C.

Figure 5:
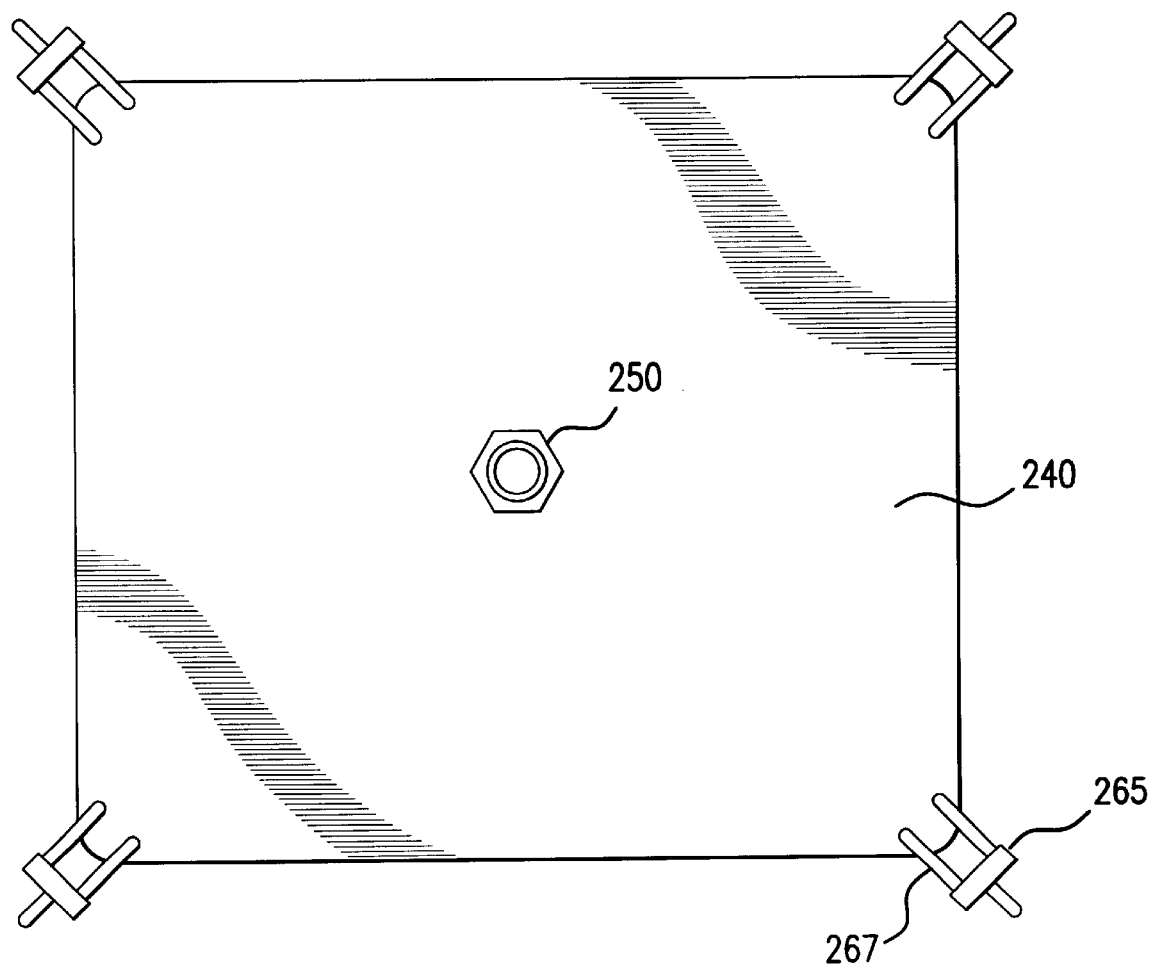
FIG. 5 depicts a top-down view of the lid for the preferred embodiment of the live transport fish tote, particularly depicting the bulkhead fitting (without periscope) and plurality of cam lock fittings disposed at the corners of the lid.

While the lid is completely removable, it preferably include a releasable latching mechanism, allowing it to be locked to the tote side walls (205). A depiction of a preferred latching mechanism is shown in FIGS. 5 and 6A–C. As shown in FIG. 5, the tote lid (240) preferably includes a plurality of cam lock fitting (265) attached thereto by elasticized hoses (267). The cam lock fittings (265) coordinate with the cam lock hook (270) recessed within the tote corners.

Latches disposed in the four corner allows a forklift operator to undo two of the four latches (left or right side) and dump the fish from the tote by rotating the tote in the direction of the released two latches. The lid swings outward and maintains a pendulum position, keeping the live fish from jumping out of the intended receiving body of water. After the fish are dumped out, reversing the rotation restores the lid in the correct position on the tote without the forklift operator having to dismount.

The totes (200) may further include a plurality of anchors permanently or semi-permanently adhered to the base of the interior surface. Like the totes themselves, the anchors are preferably fabricated from an inexpensive, durable food-grade material such as most plastics. The anchors are permanently or semi-permanently affixed to the base of the tote by marine glue, epoxy or the like. Exemplary preferred adhesives suitable for the present invention include curable polyamide resins such as those sold under the tradename "J-B Weld®" (The J-B Weld Company, Sulphur Springs, Tex.) and hot-melt polyolefin-based thermoplastic adhesives.

Figure 7:
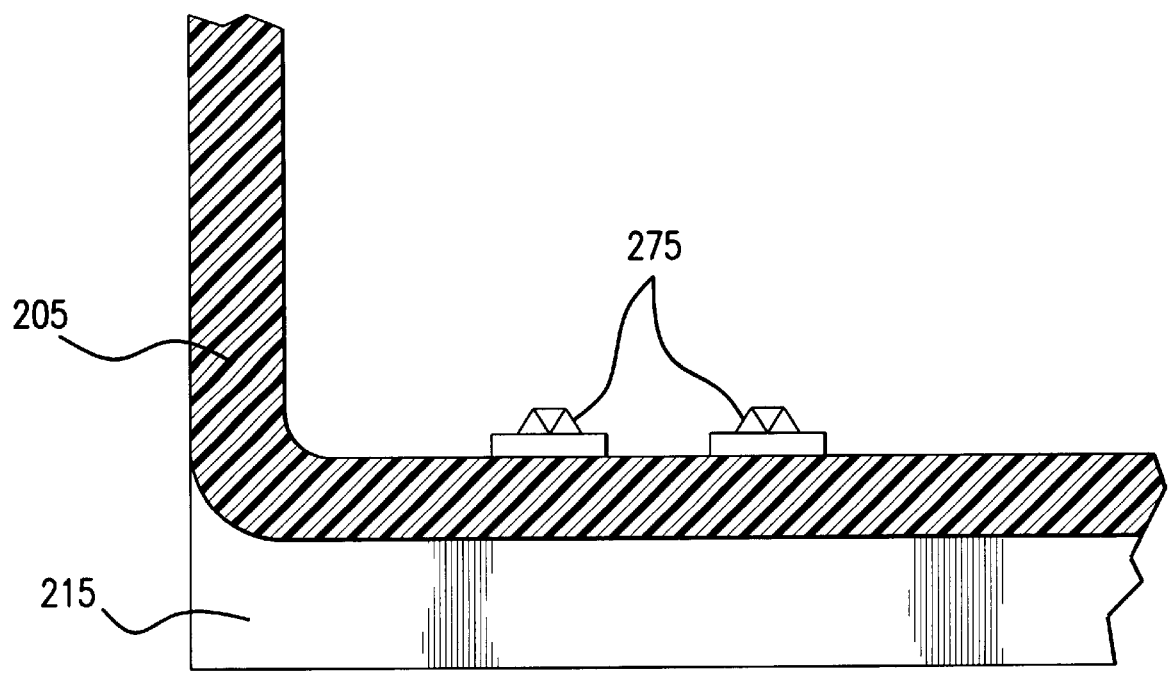
FIG. 7 depicts an exploded view in cross section of a bottom corner of the preferred embodiment of the live transport fish tote, particularly depicting the anchors adhered to the base of the interior.

The anchors serving as brackets for mounting the oxygen diffusers in position. This design allows the totes to be lifted and dumped without damaging the diffusers while also allowing for quick removal and reinstallation of the diffusers for cleaning and repair. A preferred embodiment of the tote anchor in position in the tote base is shown in FIG. 7. The anchors (275) preferably comprise a flat square base having a semi-circular arch (e.g., a bridge) disposed thereon. In a preferred embodiment, the top surface of the anchor is relatively flat so as to provide a stable surface for the oxygen diffusers to rest upon. Rounded surfaces result in a rocking motion which, in turn, can degrade the integrity of the diffusers. The tote anchors in conjunction with a preferred embodiment of the oxygen delivery system is best shown in FIG. 8.

Note, although conventional tanks have "fasteners" that coordinate with an oxygen delivery system, most such fasteners are permanently affixed to holes drilled into the inside surface the tank. These holes allow water to enter the insulation space and compromise the thermal properties of the insulation. While the amount of water may not be material to the volume of the tank, such modified tanks typically experience severely degraded thermal performance and are often unable to maintain water temperatures in adverse (i.e., large temperature differentials) ambient conditions.

As mentioned above, the present invention is also directed to an oxygen delivery system specially designed for use in the transportation and storage of live fish over extended periods of time with minimal morbidity and mortality and method for using same. The oxygen delivery system is made up of an oxygen flow meter (or rotometer); a quick-disconnect coupling for fluidically connecting the rotometer to an oxygen supply line; a series of radially projecting oxygen diffusers; and an oxygen delivery line fluidically connecting the oxygen diffusers to the rotometer.

The oxygen supply system of the present invention is most preferably used in combination with the modular live fish transport totes of the present invention. In a further preferred embodiment, the oxygen delivery system coordinates with the tote periscope and anchors adhered to the interior base of the live fish transport tote. However, it is readily apparent that the inventive oxygen supply system may be used in combination with other types of live fish containers.

Figure 9:
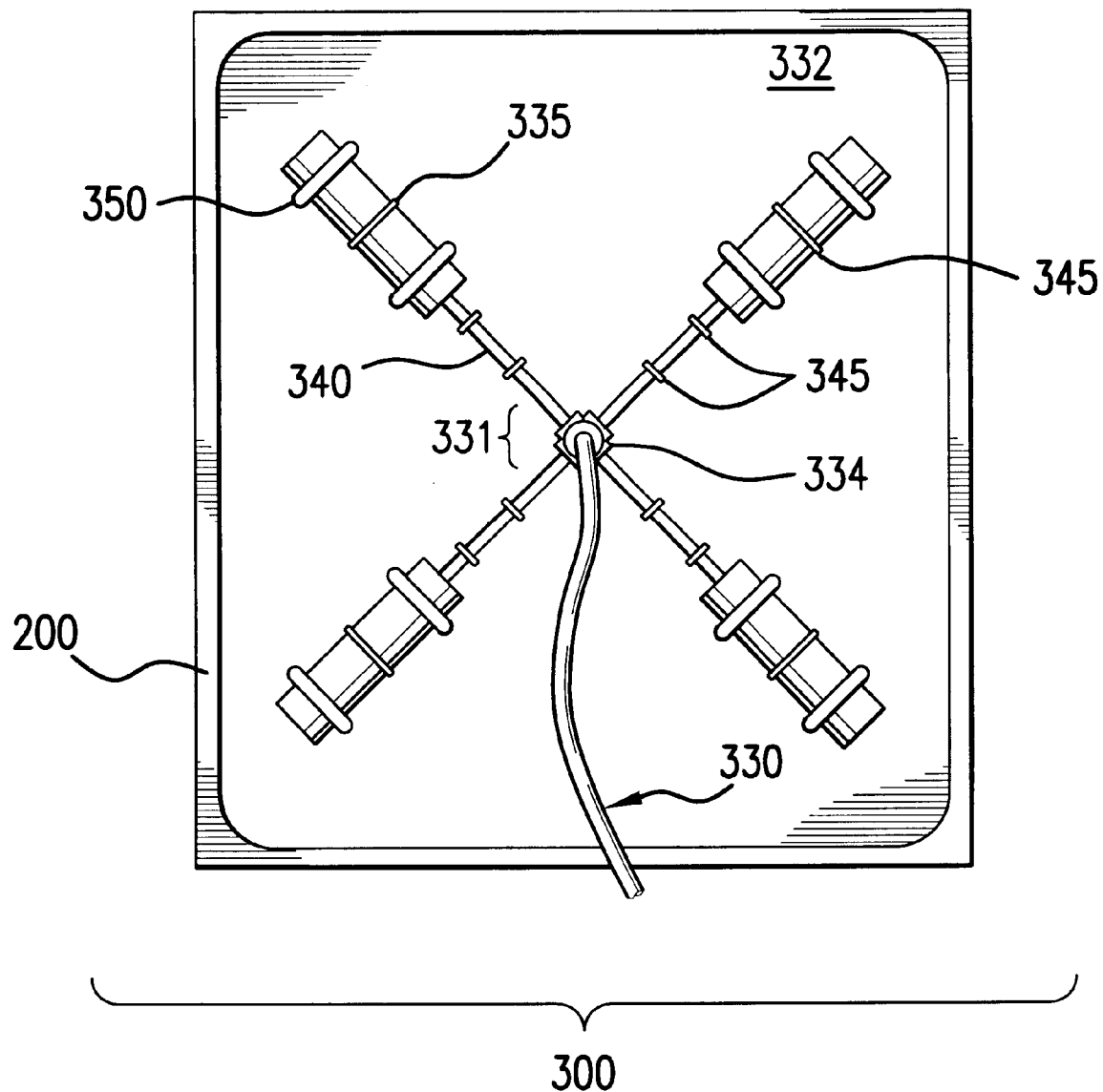
FIG. 9 depicts a top down view of the preferred embodiment of the oxygen delivery system in combination a preferred embodiment of the fish transport tote, particularly depicting the "X" configuration of the oxygen diffusers.
Figure 10:
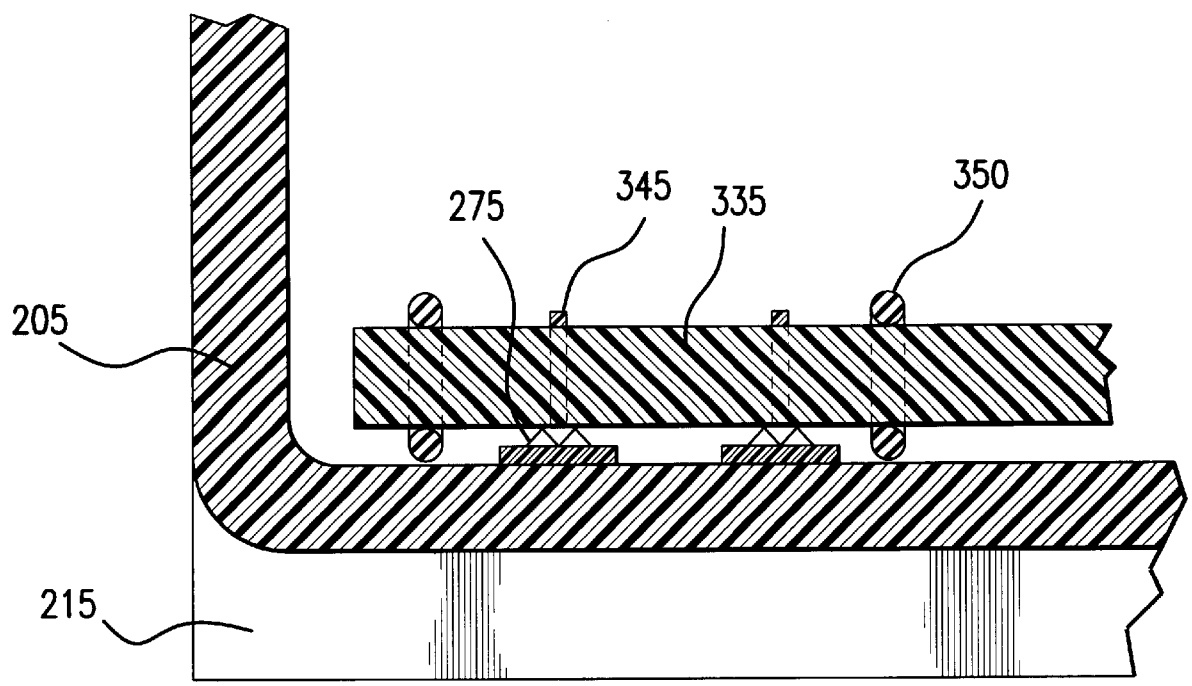
FIG. 10 depicts an exploded view in cross section of a bottom corner of the tote, particularly depicting the interaction between the oxygen diffusers of the oxygen delivery system and the anchors of the fish transport tote.

A preferred embodiment of the oxygen delivery system, shown in combination with the preferred live fish transport tote, is depicted in FIGS. 8–10. As shown in FIG. 8, the oxygen delivery system (300) includes a supply end (305) and a delivery end (310), with an oxygen flow meter or rotometer (315) disposed in between the two. In a preferred embodiment, the rotometer further includes a fastening element (not shown) that coordinates with the mounting mechanism (317) of the tote periscope (255).

The rotometer is preferably fabricated entirely from plastic to avoid problems associated with those made with glass parts. The presence of broken glass in a food-grade environment can be quite problematic. The oxygen delivery system preferably comprises an inexpensive, almost disposable rotometer of uncommonly low range, from about 0 to about 5.0 SCFH. The rotometers of the traditional livehaul system are too big to allow for such fine adjustments. Dissolved oxygen levels that are too high on a localized basis or throughout a tank cause stress to the fish via oxidation of the gill and eye surface membranes and inducing high dissolved oxygen levels in the blood of the fish. Aquaculturists refer to this as gas bubble "disease"; in human scuba divers, it's known as the bends. Internal organs such as the liver, kidneys, spleen, and the like (e.g., those with numerous fine capillaries and thin walls) can be destroyed by out-gassing of too high dissolved oxygen levels.

Referring to FIG. 8, the supply end of the rotometer (315) includes a short length of tubing (320) having a coupling mechanism (325) for fluidically connecting the short length of integral tubing (320) with a longer length of tubing (the supply line) that ultimately connects to a source of oxygen, such as a liquid oxygen tank. The coupling (325) should allow for a secure, fluid tight seal to form between the rotometer and the supply line yet also allow for convenient disconnection of the rotometer from the supply line when necessary (i.e., when totes are removed from truck and/or upended for dispensing fish). In a preferred embodiment, the pure oxygen service quick disconnect fittings is non-spark producing and made completely from materials that are non-combustible. In a further preferred embodiment, the coupling is not capable of connecting with compressed air lines and is painted a particular color (e.g., dark green) to denote oxygen. It should maintain functionality without the requirement of combustible lubricants. In a more preferred embodiment, the coupling is quick-disconnect coupling analogous to those utilized for air hoses at gas stations, preferably one that is OSHA approved for pure oxygen service.

Referring again to FIG. 8, the delivery end (327) of the rotometer (315) is fluidically connected to another length of oxygen transporting tubing, the oxygen delivery line (330). The length of the delivery line (330) is preferably sufficient to allow for the removal and repositioning of the tote lid without disconnecting the beverage hose from the radial oxygen diffusers at the bottom of the tote. Both the oxygen supply line (not shown) and oxygen delivery line (330) may be fabricated from virtually any non-reactive material though a non-kinking, non-collapsible tube such as a braided beverage hose is preferred.

The oxygen delivery line (330) in turn is sealingly coupled to the top port of a five way cross (331). Lengths of rigid polymeric tubing, such as PVC pipe, are attached to the cross side ports. Oxygen diffusers (335), preferably silica oxygen diffusers, are disposed about the delivery ends of each pipe.

The oxygen delivery system is intended to be modular and easily removable from the bottom of the fish transport tank. The oxygen diffusers may be held in position in the bottom of the tank by any non-permanent means. In a preferred embodiment, shown in exploded view in FIG. 10, the diffusers (335) are tied to anchors (275), adhered to the bottom of the transport tank, by plastic wires and/or ratcheting/locking cable ties (345). The oxygen diffusers preferably further include one or more rubber bumpers (350) disposed about the periphery. These bumpers prevent the diffusers from being damaged during insertion, removal and transport.

The Inventor has observed that fish, when stressed in transport, tend to congregate in the corners or about the periphery of the tank. The radially projecting configuration allows the highest concentrations of oxygen to be directed to the area of the tank with the highest concentration of fish. Although the "X" or cross described herein represents a preferred embodiment, it is clear that other configurations that facilitate directing oxygen flow to the tank periphery are contemplated by the invention. Exemplary shapes for the oxygen diffuser configuration include circles, spirals, asterisks and the like.

A top down view of the preferred embodiment of the oxygen supply system of the present invention positioned in the bottom of a fish transport tote, particularly depicting the preferred "X" configuration of the oxygen diffusers, is shown in FIG. 9. The X-configuration oxygen diffusing system (300) disposed on the interior base of a cube-like fish transport tote (200) is shown. Braided beverage hose delivery line (330) is attached to the supply end to the rotometer (315). In a preferred embodiment, the delivery line and rotometer are disposed in the periscope of the tank lid. The delivery end of the delivery line (330) is attached to the top port of a 5-way PVC cross (331). The side ports (334) are fluidically connected to delivery arms or pipes (340), which in turn are fitted with micro-fine silica oxygen diffusers (335), the diffusers preferably disposed about the respective ends of the delivery pipes. The X-configuration is positioned in the base of the tank such that the flow of oxygen is directed toward the tank corners (332). Each oxygen diffusers further includes at least two rubber rings or bumpers (350), preferably one disposed on either end. The diffusers (335) are releasably attached to anchors (275) adhered to the base of the tote via plastic cable ties (345). This design allows the totes to be lifted and dumped without damaging the diffusers. The design further allows for the diffusers to be quickly removed for cleaning and/or repair and just as quickly re-installed.

In a preferred embodiment, the oxygen diffusers are silica micro-pore oxygen diffusers capable of distributing the very small pure oxygen bubbles into the water column of the tote. The small bubbles results in a high transfer efficiency of oxygen gas to dissolved oxygen in the tote water. Micropore silican oxygen diffusers are most preferred because they are inexpensive, have very efficient oxygen transfer, and create very small bubbles that do not disturb or excite the fish.

Traditional transport truck frequently use air stones or large pore bubblers/diffusers to maintain proper oxygen saturation. Importantly, air stones are not oxygen diffusers. Air contains 20% oxygen by volume, and thus if air is used, five-times the bubbles are required. This "boiling" of the water using air is bad for the fish in that it makes them too active in a small space. Compressed air is typically at ambient or high temperature. Thus, infusion of air results in the warming of the tank water. Conversely, liquid oxygen is 100% oxygen, and cryogenic. Gaseous oxygen from a liquid source helps lower or maintain the water temperature.

However, livehaul systems that utilize cryogenic oxygen with large pore bubblers still suffer from numerous drawbacks. First, the pores of the traditional diffusers have a tendency to get dirty and clogged. Unlike the diffusers of the present invention, diffusers of the traditional system are permanently fixed to the bottom of the tanks and can not be cleaned in place. Using large pore bubblers and air stones not only wastes oxygen supplies but still "boils" the water, making the fish too active.

In a preferred embodiment, the diffusers are compatible with muratic acid, a material commonly used to periodically clean the pores of silica diffusers. As muratic acid is both expensive and caustic, care must be taken to use the cleaner in small volumes, preferably away from the other inventive components.

During transport of live fish, it is preferable that the oxygen saturation level be maintained as close to 100% as possible. Using the oxygen delivery system described herein, the appropriate oxygen level could be maintained in a conventional 250–300 gallon fish tank by an infusion rate of about 0–20, more preferably 0–10, more preferably 0–5 standard cubic feet per hour (SCFH). A single conventional PG4500 tank of liquid oxygen would last about 4 to 5 days. Conversely, traditional livehaul trucks infuse oxygen at a rate of 10–100, more preferably 20–200 SCFH, exhausting a standard PG4500 tank in less than 24 hours. Traditional livehaul trucks, therefore, must carry additional spare oxygen tanks if traveling more than 24 hours. While some truckers hook-up two PG4500 in parallel, there is considerable art in balancing the internal and external gas pressures of two PG4500's so that one will empty first while the second remains in reserve. Those truckers that opt to carry additional unconnected spare liquid oxygen tanks are subject to the HMR regulations described above. Thus, the oxygen delivery system of the present invention is clearly much more efficient than those of the prior art. The reduced infusion rate not only reduces the overall amount of oxygen delivered but also generates a less turbulent flow, with much smaller bubbles. The smaller bubbles are more easily dissolved in water because they have more surface area in contact with water per bubble volume than larger diameter bubbles. This correlates to more efficient and effective oxygen delivery. Increased water head pressure and depth of bubbler submersion also correlate to enhanced oxygen transfer efficiency.

Central to the invention was the idea that fish could be harvested, transported and stored until sale in a single environment, without the need for cumbersome equipment such as on-board water exchange and water recycling machines. Thus, one goal of the invention was to develop a chemically and biologically balanced aquaculture solution that could maintain physiological parameters within acceptable ranges to ensure the delivery of healthy fish with minimal stock loss. The balanced aquaculture solution of the present invention provides an inexpensive self-contained, self-maintained healthy environment transporting and storing live fish.

The present invention also provides a chemically and biologically balanced aquaculture solution for transporting and storing live fish over extended periods of time with minimal morbidity and mortality and method for making same. The balanced aquaculture solution of the present invention provides an inexpensive self-contained, self-maintained healthy environment for transporting and storing live fish. In a preferred embodiment, the balanced aquaculture solution of the present invention is used in combination with other aspects of the present invention, such as the water treatment and delivery apparatus and the modular live fish transport totes. However, the inventive balanced aquaculture solution is not limited to this utility.

Important features of the inventive aquaculture solution include not only those components that are present but also those that are absent. Herein, for convenience and clarity purposes, the aquaculture solution is often described in terms by the general process for making it. However, it is clear that the aquaculture solution is not limited by this process.

The water component of the aquaculture solution typically originates from city sources, from private water wells, or from pond reservoir. City water supplies typically contain chlorine and fluorides. Particulate matter and suspended or dissolved organic matter present in the water tend to irritate the gills of the fish, providing a nutrient-rich home for bacteria which in-turn "smother" or interfere with the water-gill interface surface area. Therefore, the aquaculture solution should be substantially free from particulate matter and suspended debris. In a preferred embodiment, the source water is filtered through a series of filters including a particulate filter of 2–5 microns filtration and at least one activated charcoal filter.

The aquaculture solution must be equilibrated to transport temperature, the temperature that is sufficient to induce a quasi-hibernation condition. Herein, we refer to this condition as "thermal stasis". The physiologically acceptable transport temperature sufficient to induce thermal stasis will vary from species to species. For example, warm water fish such as tilapia are farmed in ponds that are maintained at about 80° F. (27° C.). The transport temperature sufficient to induce thermal stasis in tilapia is about 65–70 F. (18–21° C.), more preferably about 68° F. (20° C.). Clearly, cold water fish, such as trout or salmon, require a lower transport temperature, in the range of 40–50° F. (5–10° C.). The range of transport temperatures acceptable for each particular species of fish can be readily determined by one of ordinary skill in the art of commercial aquaculture.

The aquaculture solution is titrated to the appropriate calcium water hardness level suitable for transport. This is achieved by adding calcium additives, preferably food-grade calcium additives such as calcium salts (e.g., calcium chloride quicklime, calcium carbonate, calcium hydroxide, dolomite lime, pickling lime) and the like. Fish scales appear to toughen or harden in response to increasing water hardness. The toughened scales serve as a shield, protecting against injuries associated with the high density conditions of transport. The physiologically "appropriate" calcium water hardness level will vary from one species of fish to the next. It is preferably about 20–60 ppm, more preferably 30–50 ppm, even more preferably about 40 ppm.

The aquaculture solution includes as osmoregulant, a component that establishes and maintains a proper osmotic gradient that, in turn, ensures proper electrolytic balance in the fish. This is preferably achieved by adding salts, preferably food-grade salts such as sodium chloride, potassium chloride, magnesium chloride, calcium chloride and the like. The salt level should not rise to a therapeutic level.

Importantly, the requisite osmoregulatory gradient varies from species to species. Fresh water fish "swallow" water normally to maintain their blood and flesh electrolytic balance, extracting the minerals and salts from the water that they eventually excrete from their bladder. Salt water fish don't have to "swallow" water, as the concentration of salts in the water is higher then the blood in their gills. Osmosis moves the higher concentration of salts in the water across the gill membrane into the blood until the concentration of salts in the blood matches that of the water. An exemplary appropriate osmoregulatory level of salt for fresh water fish ranges from 1–10 ppt, more preferably 2–7ppt, even more preferably about 3 ppt. The requisite osmoregulatory level of salt for other species can be readily determined by one of ordinary skill in the art, without undue experimentation.

Another important feature of the aquaculture solution is oxygen. The oxygen level in the aquaculture system is continuously monitored and maintained before transport. When used in combination with a reliable passive oxygen delivery system and a thermally insulated tote, it need not be monitored in transit. The oxygen saturation level should be maintained as close to 100% as possible. The oxygen saturation level preferably is greater than 75%, more preferably greater than 85%, even more preferably greater than 95%.

Note that different species have different minimum dissolved oxygen level requirements. For example, tilapia and catfish both survive for sustained periods in dissolved oxygen levels of 1–1.5 ppm, well below saturation. Hybrid striped bass, salmon, and trout get excited when dissolved oxygen levels approach 3–4 ppm, which suggests that the dissolved oxygen level is preferably maintained below that level. Also, oxygen saturation varies with temperature. The cooler the water, the more dissolved oxygen it can hold. An exemplary oxygen delivery system is described above. However, the aquaculture solution is not limited to this system.

High concentrations of carbon dioxide ($CO_2$) and nitrogen (e.g., ammonia) typically build up in the relatively confined volume live fish container. Elevated levels of carbon dioxide can be toxic, even lethal. For example, for most fish, $CO_2$ is toxic at 60 ppm and lethal at 100 ppm. Thus, it must be removed from the initial aquaculture solution to the extent possible. In a preferred embodiment, the aquaculture solution is initially established to be substantially free from both $CO_2$ and ammonia.

Vented air-exchange alone cannot maintain the next-to-zero level of $CO_2$ and ammonia. The aquaculture solution also contains balancing components to maintain physiologically acceptable ranges over extended periods of time. The balancing components ensure that the $CO_2$ and ammonia content in the aquaculture solution does not approach the toxic and/or lethal levels discussed above.

As mentioned above, the aquaculture solution further includes "balancing components". These balancing components promote the maintenance of physiologically acceptable conditions over extended periods of time. For example, although the tank water is initially nitrogen/ammonia-free, the introduction of fish excrement into the solution during transport and storage will result in an increasing concentration of nitrogen and ammonia over time. The balancing components of the aquaculture solution include both chemical (e.g., pH buffers) and biological (e.g., ammonia harvesting bacteria) balancers.

The aquaculture solution is preferably buffered to a pH just below neutral, more preferably between 6.8 and 6.9. Standard buffering systems utilizing an ammonia/ammonium ($NH_3/NH_4$) gradient are not suitable to the present invention because ammonia becomes increasingly toxic at increasing pH. In fact, it is toxic to most species of fish at a pH of 7.3 and above. Thus, a more natural, preferably a food-grade pH buffering system is preferred. For example, table vinegar (acetic acid) may be added to lower the pH and pickling lime (calcium hydroxide) added to bring it back up.

Table vinegar (5–7% pure acetic acid) preferably is used. The percent by volume varies according to the initial pH level of the water to be treated and the amount of pH buffering chemicals present in that water. Likewise, pickling lime percent by volume varies according to the initial pH of the water to be treated and the amount of pH buffering chemicals present in that water. The required amount of buffer can be readily calculated by one of ordinary skill in the art, using standard tools and without undue experimentation.

Importantly, the aquaculture solution is not only chemically balanced but also biologically balanced. The solution may further include a cultured strain of bacteria therein to promote the maintenance of the physiologically appropriate conditions. Though the bacteria may be dormant, in a preferred embodiment it is activated. The particular strain utilized may vary from one species of fish to the next. Examples of bacteria include nitrifying bacteria such as species of Nitrosomonas, Nitrobacters, Nitrococcus, Nitrosoccus; sludge digesting cultures such as *Bacillus subtilis, Bacillus coagulans, Bacillus licheniformis*, and *Streptococcus faecium*; and fungus eating bacteria such as *Bacillus subtilis, Bacillus coagulans*, and *Bacillus lichenifirmis*. Bacteria useful in combination with the aquaculture solution of the present invention are commercially available from a number of sources such as Star Biological (Dallas, Tex.) and Custom Biologicals (Boca Raton, Fla.). Examples of suitable bacteria include but are not limited to anaerobic denitrifying strains such as bacteria of the genera Aeromonas Psuedomonas, and Bacillis (U.S. Pat. No. 5,556,536); iron and sulfur oxidizing strains such as *Bacillus circulans, Bacillus pumilus, Bacillus polymyxa, Pseudomonas aeruginosa,* Pseudomonas sp. 200, *Bacillus acidocaldarius, Aerobacter aerogeness Esherichia coli, Bacillus cereus, Bacillus mesentericus, Clostridium polymyxa, Bacillus centrosporus, Bacillus megaterium, Clostridium butyricum, Clostridium saccharobutyricum*, Bacillus 29, and Bacillus 29A (U.S. Pat. No. 4,880,740) and fungus degraders such as the actinomycete strains of bacteria, Streplomyces WYEC 108, Streptomyces WYE 53 and Streptomyces YCED 9 (U.S. Pat. No. 5,968,503).

In one preferred embodiment, the balanced aquaculture solution of the present invention is used in combination with other aspects of the present invention, such as the water treatment and delivery apparatus and the modular fish transport totes. However, the balanced aquaculture solution of the present invention is not limited to this utility.

The present invention further provides an automated water treatment and delivery apparatus and method for use thereof for the transportation and storage of live fish over extended periods of time with minimal morbidity and mortality. In a preferred embodiment, the automated water treatment and delivery apparatus of the present invention is used in combination with other aspects of the present invention, such as the modular fish transport totes. However, the automated water treatment and delivery apparatus of the present invention is not limited to this utility.

Figure 11:
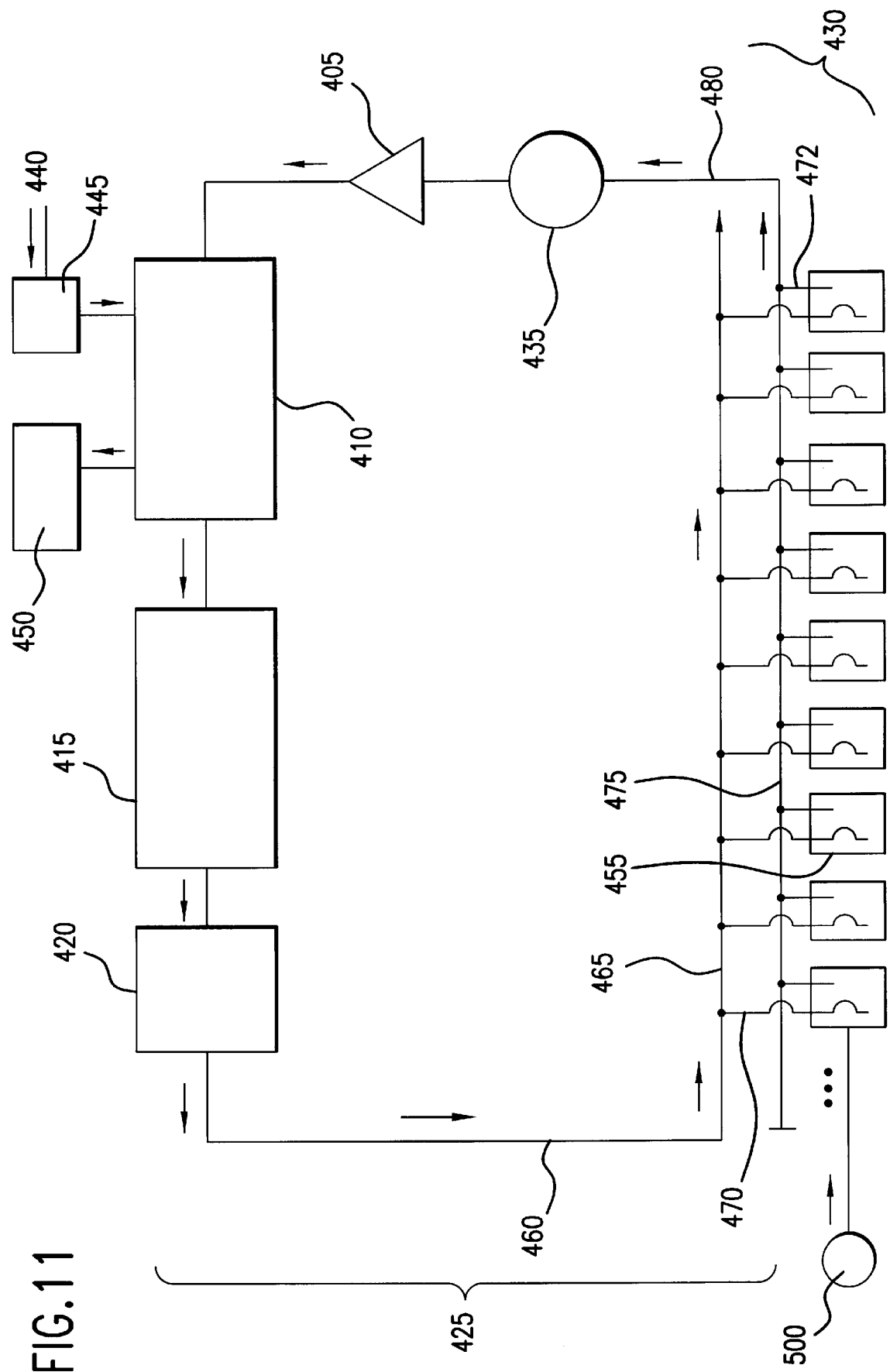
FIG. 11 depicts a schematic of a preferred embodiment of the water treatment and delivery apparatus of the present invention.

The automated water treatment and delivery apparatus, schematically depicted in FIG. 11, generally includes (i) a coarse matter filter (405); (ii) an ammonia remover (410); (iii) a temperature controller (415); (iv) a filtered water reservoir (420); (v) a carbon dioxide remover (not shown); (vi) a dispensing mechanism (425); (vii) a suction mechanism (430); and (viii) a circulation pump (435). The automated water treatment and delivery apparatus may further be operatively connected to an oxygen supply source (500).

The water to be treated typically originates from city sources (440), from private wells or from pond reservoir. Filtered city water is stored in a backwash reservoir (445) and eliminated via back wash drainage (450). Alternatively, the source water may be suctioned from a plurality of transport tanks (455) having harvested fish and well water disposed therein. This source water must be filtered to remove particulate matter and suspended debris. The initial filtration system preferably utilizes a series of cartridge filters including a particulate filter of 2–5 microns filtration and at least one, preferably at least two, activated charcoal filter.

Prior to return to the harvest/transport tank, the water is filtered to remove ammonia. The physical embodiment of the ammonia remover may take virtually any form. Large sand/swimming pool nitrogen filters, e.g., 30–36 inches in diameter, such as those standard in the art through which large volumes of water may be pumped, are preferred. The ammonia removal itself may occur by chemical or biological means. In a preferred embodiment, the ammonia remover (410) utilizes a zeolite media. Though cream-colored zeolite may be used, it tends to flake and leave a skim milk appearance to the water. In the context of the present invention, the gray-green zeolite is most preferred. It is clear, however, that other nitrogen/ammonia removing systems such as chlorination followed by peroxide dosing (see U.S. Pat. No. 4,844,012 incorporated by reference herein) may be used in the water treatment apparatus.

The water treatment and delivery apparatus further includes an automated temperature control mechanism. The temperature control mechanism carefully controls the amount of temperature change and the rate of change per unit of time, digitally monitoring and adjusting against given settings, without human intervention. A water chiller-heat pump (415) is preferred as it allows for the efficient heating or cooling of the reservoir/tote water to the transport temperature appropriate to the particular fish species being transported. Water temperature can be safely lowered at a faster rate than it may be raised. Typically, water temperature is lowered at a rate of about 2° C. per hour and raised at a rate of about 1° C. per hour when raise water temperature.

The water treatment and delivery apparatus further includes a reservoir (420) where the filtered, nitrogenlammonia-reduced, cooled water is held prior to return to the transport tank. The reservoir water is cycled or splashed to remove carbon dioxide. Though physical carbon dioxide purging is the preferred method of $CO_2$ removal, alternate mechanisms are also acceptable. The reservoir also serves as the location for the introduction of biochemical additives, such as calcium and sodium, and chemical and biological balancing component, such as pH buffers and nitrifying bacteria.

The chemically and biologically balanced reservoir water is then fed to a plurality of live fish transport tanks (455). In a preferred embodiment, the water is gravity fed through a supply line (460) that is fluidically connected to a supply manifold (465). The supply line (460) and supply manifold (465) are preferably large diameter tubes made from a non-reactive durable material such as PVC. A plurality of flexible, valved hoses (470) extend from the supply manifold. The valves (not shown) allow for the operation of the system with any number of tanks. The supply hoses (470) are placed in the tanks (455).

The water treatment and delivery apparatus further includes a series of suction hoses (472). Initially, suction hoses were selected from opaque flexible spiral hoses, such as those used for swimming pools. These were found to be very temperature sensitive, loosing flexibility and becoming stiff at cooler temperatures. The opaque nature of the hoses prevented air leaks from being seen. Subsequently, transparent, smooth-inside-diameter, spiral flexible hoses that just slip over the outside diameter of PVC pipe snuggly without air leaks were utilized and deemed preferred.

The suction hoses (472) coordinate with a suction manifold (475) and, in turn, a suction line (480). The suction line (480) is operatively connected to a circulation pump (435). The pump (435) may optionally feed water through an in-line pre-filtration device (405) before circulating it back to the ammonia remover (410). The pre-filter (405) is preferably a bag filter, more preferably two bag filters installed in duplex. This eliminates the need for work stoppage during cleaning and repair. The duplex arrangement allows one filter to be in use while the other is cleaned or repaired. The filtered water is then pumped back into the ammonia remover and recirculated through the water treatment apparatus, if necessary.

Many metals are toxic in various degrees to fish. Copper tubing and piping have often been used to make the "bubbler racks" in traditional livehaul trucks. Recognizing the risks inherent in such materials, the components of the present system, from the oxygen delivery system to the water treatment and delivery apparatus, are preferably substantially free from metal and metal additives. For example, the pipe fittings, couplings and valves of the present invention are preferably free from copper and substantially free from brass (an alloy containing copper and zinc) and bronze (an alloy of copper and tin). Components that require the strength or thermal properties of metal, such as the coils of the water-chiller/heat-exchanger of the water treatment and delivery apparatus, are preferably made from titanium to avoid copper toxicity.

The invention herein contemplates not only an "origin" automated water treatment and delivery apparatus but also a "destination" apparatus, e.g., a remote site where the treated water (e.g., the chemically and biologically balanced aquaculture) near the end of its useable life could be re-treated to extend delivery times. Whereas the origin apparatus would be used at the fish farm itself, the destination apparatus could be installed at distribution sites distant from the fish farm. The use of a destination apparatus would not only keep the fish at the peak of perfection at the destination, but also double the density of bio-mass per tote on the truck, halving the transportation cost per pound of fish transported. The components of the destination water treatment and delivery apparatus would be essentially the same as the origin one, though likely on a smaller scale.

Although the foregoing invention has been described in some detail by way of illustration and example, for purposes of clarity of understanding, it will be apparent to those skilled in the art that certain changes and modifications may be practiced within the scope of the appended claims.

What is claimed:

1. An oxygen delivery system comprising an oxygen flow meter having a supply coupling for fluidically connecting said flow meter to an oxygen supply line and a delivery coupling for fluidically connecting said flow meter to an oxygen delivery line; an oxygen diffusing system having a plurality of radially extending oxygen diffusers, said diffusers directing oxygen to the periphery of a fish tank; and an oxygen delivery line sealingly connecting said flow meter to said oxygen diffusing system.

2. The oxygen delivery system of claim 1, wherein said oxygen diffusers further comprise micro-fine silica diffusers.

3. The oxygen delivery system of claim 1, further comprising an oxygen supply source fluidically connected to said flow meter via said supply coupling.

4. A live fish transport tote comprising a modular insulated container formed from a lightweight, durable material having interior and exterior surfaces, an integral footed base and sidewalls, and a removable lid with a vent hole disposed in the center thereof, wherein said tote further comprises a bulkhead fitting disposed within said vent hole for securing a periscope pipe.

5. The tote of claim 4, further comprising a plurality of mounting brackets adhered to said interior surface.

6. The tote of claim 4, further comprising a footed base and sidewall grooves, both of which coordinate with the tines of a forklift.

7. The tote of claim 4, further comprising a periscope pipe for venting said tote to the exterior environment attached to said bulkhead fitting.

8. A live fish transport tote comprising a modular insulated container formed from a lightweight, durable material, said container further comprising: (1) interior and exterior surfaces, the base of said interior surface having a plurality of mounting brackets adhered thereto; (2) an integral base and sidewalls, said base and sidewalls having grooves which coordinate with the tines of a forklift; (3) a removable lid with a vent hole disposed in the center thereof, said vent hole further comprising a bulkhead fitting disposed within said vent hole for securing a periscope pipe and a periscope pipe for venting said tote to the exterior environment attached to said bulkhead fitting, and (4) an oxygen delivery system comprising (i) an oxygen flow meter having a supply coupling for fluidically connecting said flow meter to an oxygen supply line and a delivery coupling for fluidically connecting said flow meter to an oxygen delivery line; (ii) an oxygen supply source fluidically connected to said flow meter via said supply coupling; (iii) an oxygen diffusing system having a plurality of radially extending oxygen diffusers, said diffusers directing oxygen to the periphery of a fish tank; and (iv) an oxygen delivery line sealingly connecting said flow meter to said oxygen diffusing system, wherein said flow meter and delivery line are disposed within said vent hole and lockingly coordinate with said bulkhead fitting and periscope pipe, and said mounting brackets lockingly coordinate with said radial arms of said oxygen diffusing system.

9. The tote of claim 8, wherein said radial arms are removably anchored to said mounting brackets.

10. A chemically and biologically balanced aquaculture solution for transporting and storing live fish over extended periods of time with minimal morbidity and mortality, said solution being substantially free from carbon dioxide and ammonia and comprising an osmoregulatory salt gradient, an oxygen saturation level sufficient to maintain a plurality of fish, a calcium water hardness level sufficient to induce toughening of fish scales, a dynamic pH buffering system, and a bioactive bacterial culture, said solution maintained at a temperature sufficient to induce thermal stasis.

11. The aquaculture solution of claim 10, wherein the concentration of calcium in said solution is about 20 to about 60 ppm.

12. The aquaculture solution of claim 10, wherein the concentration of said osmoregulatory salt in said solution is about 1 to 10 ppt.

13. The aquaculture solution of claim 10, wherein said dynamic pH buffering system maintains a solution pH of about 6.8 to about 6.9.

14. The aquaculture solution of claim 10, wherein said bacterial culture is comprised of an activated nitrifying strain of bacteria.

15. A method for preparing a chemically and biologically balanced aquaculture solution for use in transporting live fish over extended period of time comprising:

(a) removing particulate matter from source water;

(b) filtering said source water through an ammonia remover;

(c) adjusting the temperature of said filtered water to a temperature suitable to induce thermal stasis in fish;

(d) removing carbon dioxide from said cooled, filtered water; and (e) adding chemical and biological balancing components to said water.

16. The chemically and biologically balanced aquaculture solution prepared by the water treatment method of claim 15.

17. A method for transporting and storing live fish over extended periods of time comprising:

i. harvesting a quantity of fish and source water into a plurality of live fish transport totes according to claim 4;

ii. coordinating said totes with an automated water treatment and delivery apparatus, said automated water treatment and delivery apparatus comprising a suction system, a circulation pump, at least one filtration component, at least one treatment component, and a water dispenser;

iii. removing source water-from said totes by said suction system;

iv. circulating said source water through said filtration component to establish filtered source water;

v. circulating said filtered source water through said treatment component to establish a chemically and biologically balanced aquaculture solution;

vi. returning said chemically and biologically balanced aquaculture solution via said water dispenser to said plurality of live fish transport totes; and vii. loading said totes onto a delivery vehicle;

wherein said fish may be transported and stored within said totes for an extended period of time with minimal stock loss.

* * * * *